United States Patent
Kato et al.

[15] 3,656,208
[45] Apr. 18, 1972

[54] WINDSHIELD WIPER

[72] Inventors: Masumi Kato, Aichi-gun; Yoshiyuki Morita, Kariya-shi, both of Japan

[73] Assignee: Nippondenso Kabushiki Kaisha, Kariya-shi, Aichi-ken, Japan

[22] Filed: Dec. 23, 1969

[21] Appl. No.: 887,493

[30] Foreign Application Priority Data

| Mar. 6, 1969 | Japan | 44/17075 |
| Dec. 25, 1968 | Japan | 43/113946 |
| Jan. 6, 1969 | Japan | 44/1903 |

[52] U.S. Cl. .................. 15/250.31, 15/250.21, 15/250.34
[51] Int. Cl. ............................................................ B60s 1/34
[58] Field of Search .......... 15/250.3, 250.34, 250.35, 250.13, 15/250.23, 250.21, 250.31

[56] References Cited

UNITED STATES PATENTS

| 1,668,278 | 5/1928 | Langdon | 15/250.3 X |
| 1,719,444 | 7/1929 | Oishei | 15/250.3 |
| 2,834,038 | 5/1958 | Kramer | 15/250.23 |
| 2,878,506 | 3/1959 | Krohm | 15/250.21 |
| 3,082,462 | 3/1963 | Barenyl | 15/250.3 |

Primary Examiner—Peter Feldman
Attorney—Cushman, Darby & Cushman

[57] ABSTRACT

Improved construction of a windshield wiper in which a wiper arm is supported by a pivot shaft by means of an arm joint. The arm joint has an extension forming a driving lever integrally formed in the arm joint, the pivot shaft is provided with a disc-like bearing plate integral therewith and extending radially therefrom so that the bearing plate is supported at its outer peripheral portion. The wiper arm may comprise a sub-arm together with a main arm, and the sub-arm is formed with an arcuate slot at its hinged portion through which the pivot shaft passes. The size and configuration of the slot so determined that the position of the sub-arm can be freely selected without being restricted by the position of the pivot shaft of the main arm.

8 Claims, 16 Drawing Figures

PATENTED APR 18 1972 3,656,208

INVENTORS
Masumi Kato
Yoshiyuki Morita

BY Cushman, Darby & Cushman
ATTORNEYS

3,656,208

WINDSHIELD WIPER

BACKGROUND OF THE INVENTION

1. Field of the Invention

The present invention relates to improvements in a windshield wiper, and particularly to the pivot joint portion and the bearing means of the driving shaft of the wiper arm thereof, and further relates to improvements in the construction of the sub-arm of the wiper of the pantograph type.

2. Description of the Prior Art

The pivot joint portion of a windshield wiper of the prior art is constructed by an arm joint, a pivot shaft of the wiper arm, a driving lever and ball joint means provided between the driving lever and a link rod connected to a wiper motor. The driving force of the wiper motor is transmitted to the pivot joint portion through the link rod. In such a construction, since the driving force is transmitted to the wiper arm through the pivot shaft, it is necessarily required to have sufficient strength for transmitting the driving force, thereby rendering the pivot shaft to be of the greater diameter. Further, serration must be provided in both the arm joint and the pivot shaft engaging with each other so as to prevent the relative slippage therebetween. This is disadvantageous.

Further, the bearing means of the wiper arm of the prior art windshield wiper is constructed by pressure receiving member(s) for supporting the pivot shaft of the wiper arm and a bearing retainer body for securing the pressure receiving member(s). However, since it is necessary to make the bearing means long enough for withstanding the load applied to the pivot shaft, the driving shaft must be made long thereby occupying the substantial portion of the limited space beneath the dashboard. Since this space is very important in order to locate therein various instruments, it is disadvantageous to utilize a driving shaft of greater length in that the arrangement of the various instruments is made very difficult.

Further, in case of a windshield wiper of the pantograph type, the sub-arm of a wiper of the prior art is in the form of a rod-like arm having a hinge hole at its tip. Therefore, the hinged point of the sub-arm is necessarily limited to such a position that it will not interfere with the main arm of the wiper arm, because there is a danger that the sub-arm interferes with the driving shaft of the main arm depending upon the position of the hinge point when the wiper arm is rotated.

The present invention aims at avoiding the above described disadvantages of the prior art windshield wipers.

SUMMARY OF THE INVENTION

An object of the present invention is, therefore, to simplify the construction of a windshield wiper for solving the above described disadvantages by providing an extension in the arm joint so as to utilize the same as the driving lever thereby permitting the diameter of the pivot shaft to be thin and, at the same time, permitting the serration in the pivot shaft as well as in the arm joint to be dispensed with.

Another object of the present invention is to enable the length of the pivot shaft of the wiper without deteriorating the mechanical strength for withstanding the load by providing a disc-like bearing plate integrally in the pivot shaft which extends radially from the pivot shaft and which is supported at its outer peripheral portion by means of pressure receiving member(s) so that the bearing plate and the pressure receiving member(s) form the bearing means of the driving shaft i.e. the pivot shaft thereby permitting sufficient free space to be provided beneath the dashboard so that the arrangement of the various instruments is easily carried out in that free space.

Still further object of the present invention is to provide an improved sub-arm of the wiper arm in a windshield wiper of the pantograph type by providing a slot in the hinged portion of the sub-arm through which the driving shaft of the main arm passes, the size and configuration of the slot being determined in accordance with the diameter of the driving shaft and the rotating angle of the wiper so that the position of the hinge point of the sub-arm can be freely selected without being restricted by the position of the driving shaft of the main arm.

These objects are achieved in accordance with the present invention by novel features of the wipers which are characterized by the provision of an extension of the arm joint which forms a driving lever for driving the wiper arm, the driving lever being operatively connected to the driving motor of the wiper through connecting means, by the provision of a disc-like bearing plate integrally formed with the pivot shaft of the wiper arm and extending radially therefrom, the bearing plate being supported by pressure receiving member(s) at its outer peripheral portion, and by the provision of an arcuate slot at the hinged portion of a sub-arm of the wiper arm in a pantograph type wiper through which the pivot shaft of the main arm passes, the size and the configuration of the slot being determined according to the diameter of the pivot shaft as well as the rotating angle of the wiper arm so that the pivot point of the sub-arm can be freely selected at any position without being restricted by the position of the pivot shaft of the main arm of the wiper arm.

Now, preferred embodiments of the present invention will be described below with reference to the accompanying drawings illustrating the same, in which the similar or common parts are designated by the same reference numerals.

DESCRIPTION OF THE PREFERRED EMBODIMENTS

Prior to the description of the embodiments of the present invention, a brief description will be given to a windshield wiper of the prior art for the better understanding of the present invention.

Figure 1:
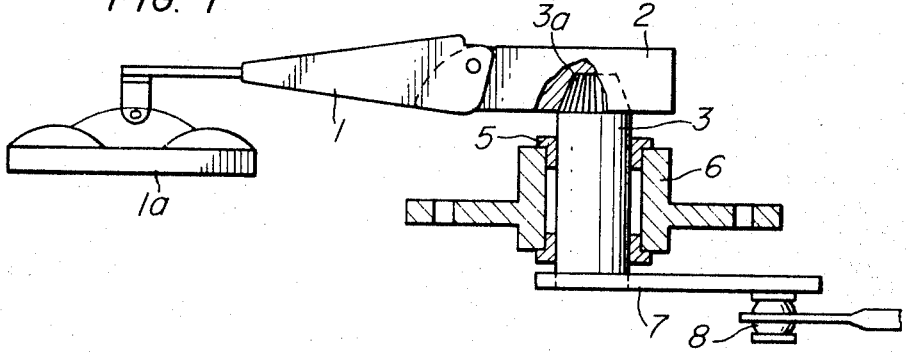
FIG. 1 is a side view partly in section showing a windshield wiper of the prior art.
Figure 2:
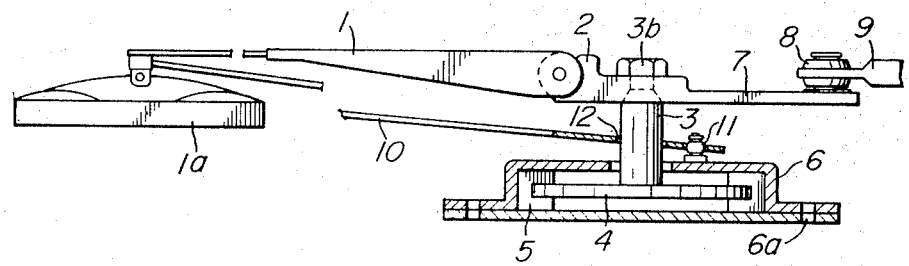
FIG. 2 is a side view similar to FIG. 1 but showing a windshield wiper constructed in accordance with the present invention.
Figure 3:
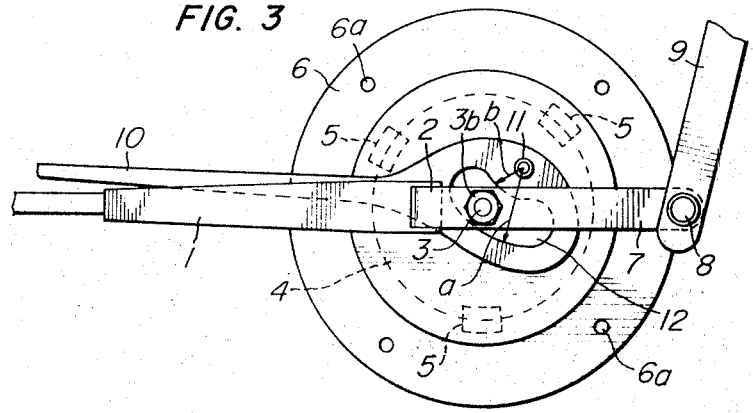
FIG. 3 is a plan view of FIG. 2.

In the prior art wiper shown in FIG. 1, a wiper arm 1 having wiping blade 1a at its tip is connected to an arm joint 2 which is secured to a pivot shaft 3. Serration 3a is provided in each of the arm joint 2 and the pivot shaft 3 which engages with each other so as to positively prevent the relative rotation between the arm joint 2 and the pivot shaft 3.

The bearing means for the pivot shaft 3 is constructed by pressure receiving member(s) 5 supporting the pivot shaft 3 and a bearing supporting body 6. The bearing supporting body 6 is fixedly secured to a stationary portion of the vehicle at its stay portion 6a by means of bolts (not shown).

The driving force of the wiper motor (not shown) is transmitted through a link rod 9 connected thereto, through ball joint means 8 to a driving lever 7 secured to the pivot shaft 3 so that the same is rotated by the driving lever 7. Therefore, the pivot shaft 3 is required to be of a greater diameter so as to have sufficient strength to enable the torque of the driving lever 7 to be transmitted therethrough to the wiper arm 1. The greater diameter of the pivot shaft 3 and the provision of the serration 3a in each of the arm joint 2 and the pivot shaft 3 are disadvantageous as previously described.

Figure 4:
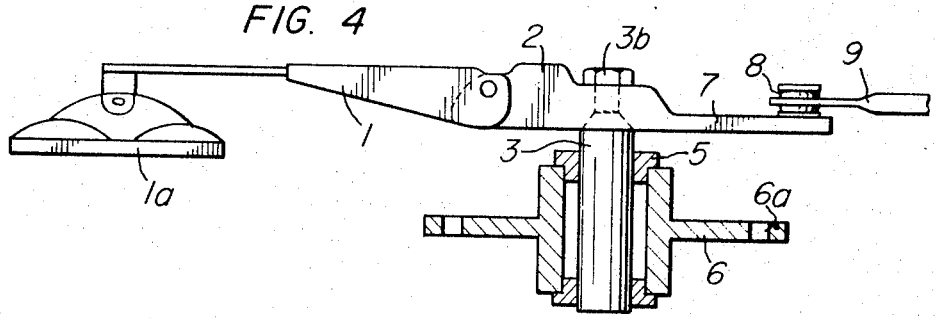
FIGS. 4, 5, 6, 7, 8, 9A and 10A are side views each showing various preferred embodiments of the present invention.
Figure 5:
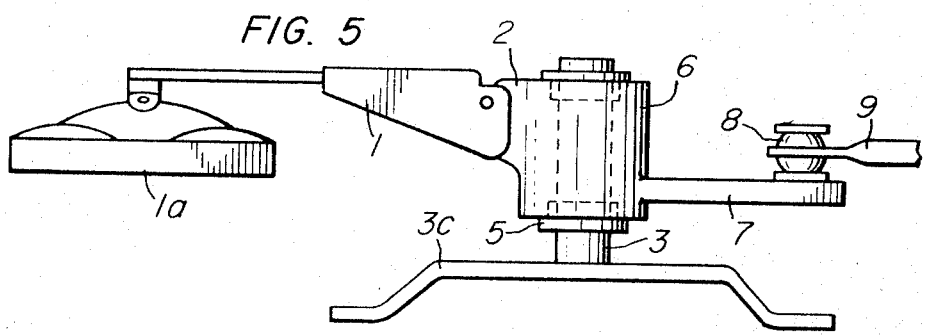

In the embodiments of the present invention shown in FIGS. 4 and 5, respectively, an extension designated by the reference numeral 7 is provided in the arm joint 2 which serves as the driving lever 7.

In the above construction, the driving force of the wiper motor is transmitted through the link rod 9 to the ball joint means 8, and thence directly to the arm joint 2 without being transmitted through the pivot shaft 3. Therefore, the pivot shaft 3 suffices to merely support the arm joint 2.

In the embodiment shown in FIG. 4, the arm joint 2 is secured to the pivot shaft 3 by means of a nut 3b.

In the embodiment shown in FIG. 5, the arm joint 2 is rotatably supported by bearings 5 about the shaft 3 which is fixedly secured to a stay 3c which is in turn fixedly secured to a stationary portion of the vehicle.

As described above, the pivot shaft 3 suffices to merely support the arm joint 2 without being required to transmit the rotational driving force therethrough. Therefore, the diameter of the pivot shaft 3 can be made smaller than that of the prior art wiper.

Further, since the driving force of the wiper motor is directly transmitted from the ball joint means 8 to the arm joint 2, it is not necessary to engage the arm joint 2 with the pivot shaft 3 by means of the serration as is required in the prior art wiper thereby permitting the construction of the power transmitting portions of the windshield wiper to be greatly simplified.

Figure 6:
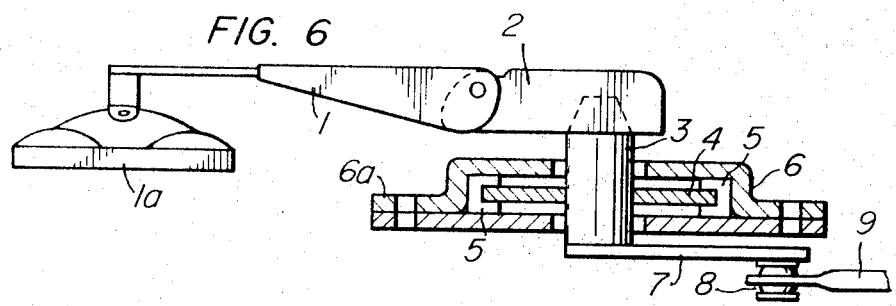
Figure 7:
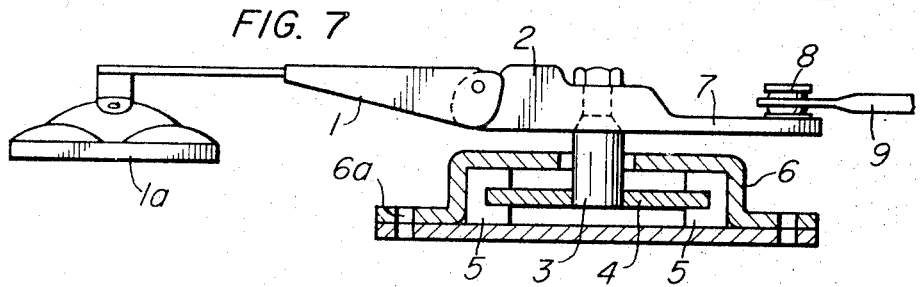

In the embodiments shown in FIGS. 6 and 7, respectively, a disc-like bearing plate 4 is secured to the pivot shaft 3 which extends radially from the pivot shaft 3. Pressure receiving member(s) 5 having U-shaped cross-section are supported by bearing supporting body 6 secured stationarily to a stationary portion of the vehicle at its stay portion 6a by bolts (not shown), and the pressure receiving member(s) 5 engage with the outer peripheral portion of the bearing plate 4 so that the latter is rotatably supported thereby with the axial movement of the bearing plate 4 being prevented.

In the embodiment shown in FIG. 7, the driving lever 7 is integrally formed in the arm joint 2 and it is connected to the link rod 9 through the ball joint means 8.

In the above described embodiments, when the pivot shaft 3 is rotated by the link lever 7, the bearing plate 4 integral with the pivot shaft 3 is rotated. The axial load is born by either of the upper and lower opposing inner side walls of the pressure receiving member(s) 5. Therefore, by enlarging the pressure receiving surfaces of the pressure receiving member(s) 5 by increasing the radius thereof, greater load can be born by the pressure receiving member(s) 5.

Figure 8:
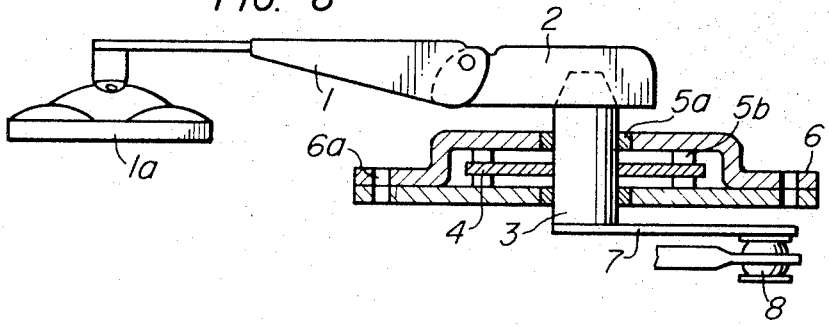

In the embodiment shown in FIG. 8, the driving lever 7 is secured to the pivot shaft 3 through which the driving force of the wiper motor (not shown) is transmitted to the arm joint 2.

In the embodiment shown in FIG. 8, the radial force and the axial force generated directly or from the bending load are received separately by means of bearing members 5a and 5b, respectively.

In the embodiment of FIG. 8, an extension may be provided in the arm joint 2 which serves as a driving lever as in the case of the embodiment of FIG. 7.

Figure 9A:
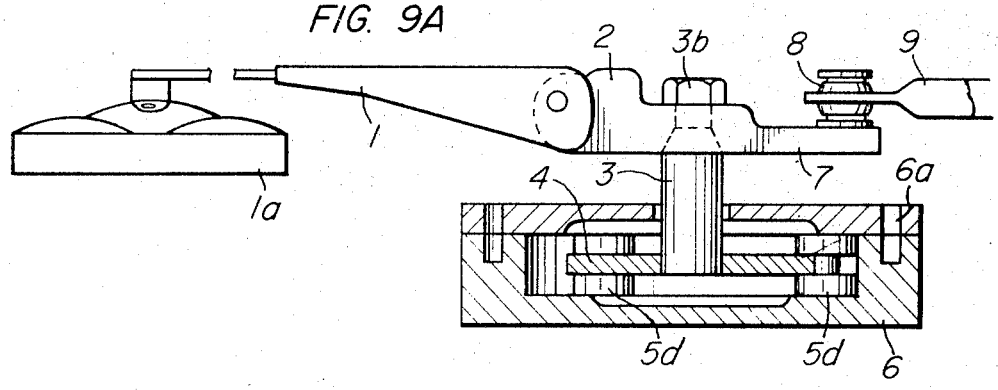
Figure 9B:
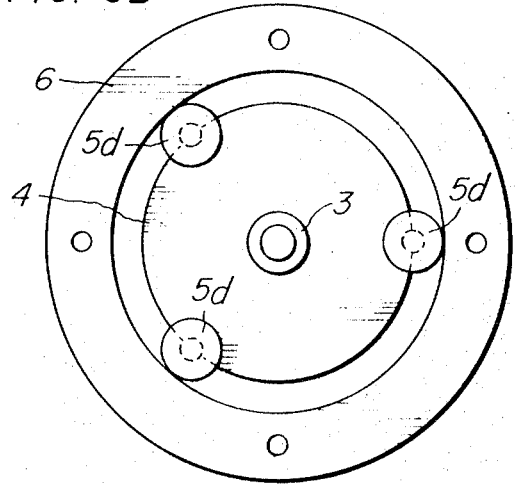
FIGS. 9B and 9C are plan view and side view, respectively, showing the relationship between the bearing plate and the roller bearings in the embodiment shown in FIG. 9A.
Figure 9C:
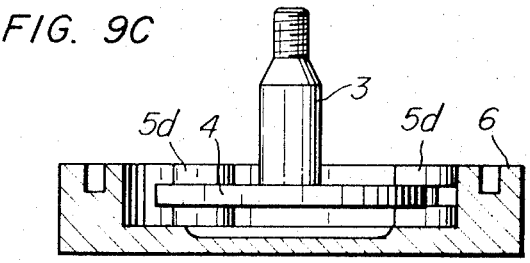

In the embodiment shown in FIGS. 9A, 9B and 9C which is substantially similar to that shown in FIG. 7, a plurality of semi-circular recesses are provided in the peripheral edge of the bearing plate 4 in which the shaft portions of roller bearings 5d rollingly guided by bearing supporting body 6 are rotatably fitted so as to prevent the bearing plate from being burnt by the bearing supporting body 6 due to the high peripheral speed of the bearing plate 4 during the operation thereof. A cover plate is mounted on the body 6 by studs 6a.

Figure 10A:
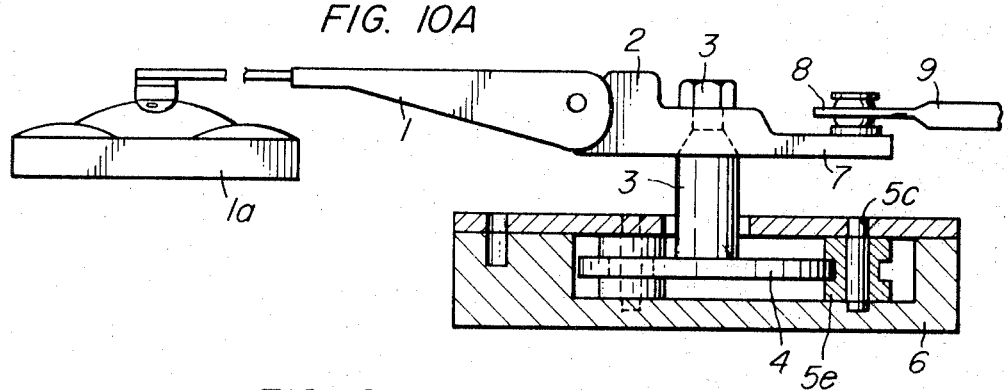
Figure 10B:
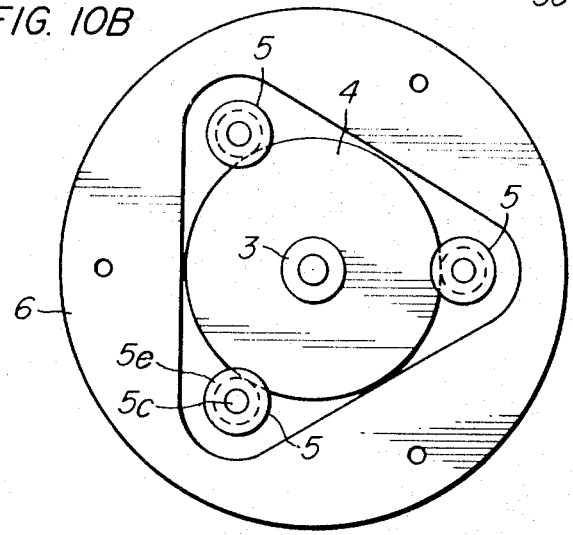
FIGS. 10B and 10C are plan view and side view, respectively, showing the relationship between the bearing plate and the bearings incooporated in the embodiment shown in FIG. 10A.
Figure 10C:
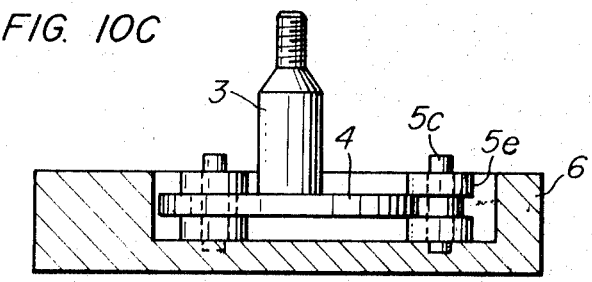

In the embodiment shown in FIGS. 10A, 10B and 10C, guide studs 5c are fixedly secured to the bearing supporting body 6 as well as to the cover plate around the outer periphery of the bearing plate 4 spaced an appropriate distance therefrom, roller bearings 5e being rotatably supported on the guide studs 5c so that the bearing plate 4 is rotatably supported by the roller bearings 5e by the engagement of the circular groove formed in each of the roller bearings 5e with the outer peripheral portion of the bearing plate 4 thereby permitting the rotational friction of the bearing plate 4 to be greatly reduced.

As described above, in the embodiments of the present invention, since the disc-like bearing plate 4 is integrally provided in the pivot shaft 3 and the outer peripheral portion of the bearing plate 4 is supported by the pressure receiving member(s) 5, so that the bearing means is constructed by the bearing plate 4 and the pressure receiving member(s) 5, the force applied to the bearing means is born by the engaging surface of the pressure receiving member(s), thereby permitting the greater load to be supported by the pivot shaft 3 without requiring the pivot shaft 3 to be elongated by enlarging the pressure receiving surfaces of the pressure receiving member(s) 5 by increasing the radius of the bearing plate 4, and, at the same time, the free space beneath the dashboard can be enlarged so that the arrangement of the various instruments in the free space is made easy.

An embodiment of the present invention embodied in the pantograph type wiper will be described below in connection with FIGS. 11 and 12.

Figure 11:
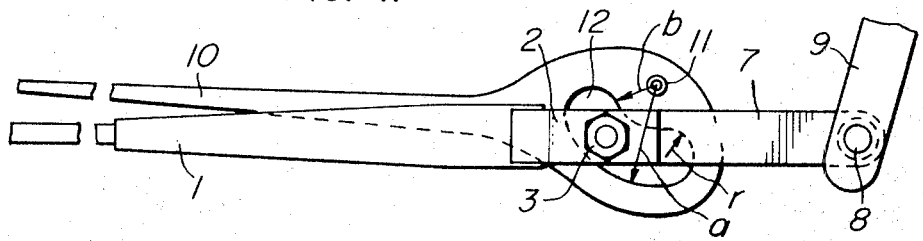
FIG. 11 is a fragmentary plan view showing the arrangement of the main arm and the sub-arm of the embodiment of a pantograph type wiper constructed in accordance with the present invention.

In FIG. 11, main arm 1 is rotatable by driving shaft 3, i.e. pivot shaft, secured thereto. A sub-arm 10 is pivoted at hinge point 11. The position of each of the driving shaft 3 and the hinge point 11 is stationary with respect to the vehicle.

In accordance with the present invention, the hinged portion of the sub-arm 10 is enlarged and an arcuate slot 12 is formed therein. The driving shaft 3 passes through the slot 12. The size and configuration of the slot 12 is so determined that the radius of curvature $a$ of the outer arcuate side corresponds to the distance between the center of the hinge point 11 and the center of driving shaft 3 plus the radius $r$ of the drive shaft 3, while the radius of curvature $b$ of the inner arcuate side corresponds to the distance between the center of the hinge point 11 and the center of the drive shaft 3 minus the radius $r$ of the drive shaft 3, both ends of the slot 12 being closed by semi-circle having the radius of $r$. The arcuate length of the slot 12 and the position of the slot 12 are determined by the rotational angle of the wiper and the relative position of the hinge point 11 with respect to the position of the drive shaft 3.

The operation of the above described embodiment is as follows.

Figure 12:
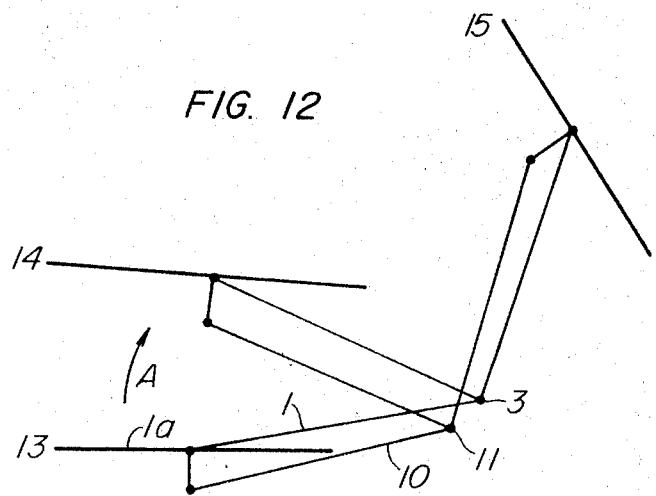
FIG. 12 is a graph showing the actuation of the mechanism of the wiper shown in FIG. 11.

In FIG. 12, the relative positions of the main arm 1 and the sub-arm 10 shown in FIG. 11 are designated by the reference numeral 13. When the main arm 1 is rotated in the direction shown by A to a position shown by 14, the sub-arm 10 is also moved in the direction of A together with the slot 12 formed in the hinged portion of the sub-arm 11, so that the slot 12 is moved relatively to the pivot shaft 3, i.e. the driving shaft, passing therethrough to a position in which the drive shaft 3 is located substantially at the center of the slot 12.

When the main arm 1 is moved to the position indicated by 15 in FIG. 12, the slot 12 comes to a position at which the driving shaft 3 is located relatively to the slot 12 at the rightmost position therein. Therefore, by determining the arcuate length of the slot 12 appropriately in accordance with the rotational angle of the wiper, the movement of the sub-arm 10 is not interfered by the drive shaft 3 of the main arm 1.

As described above, since a slot for passing the drive shaft of the main arm is provided in the hinged portion of the sub-arm and the size and the configuration of the slot are determined in accordance with the diameter of the drive shaft, i.e., the pivot shaft of the main arm and the rotational angle of the wiper, the position of the hinge point of the sub-arm can be freely selected without being restricted by the position of the drive shaft, i.e. the pivot shaft of the main arm.

I claim:

1. An improved windshield wiper assembly comprising:
   a wiper arm provided with wiping blade means at the tip thereof,
   a pivot shaft for supporting said wiper arm,
   an arm joint for connecting said wiper arm to said pivot shaft, bearing means for supporting said pivot shaft,
a disc-like bearing plate integrally formed with said pivot shaft and extending radially therefrom, and
a pressure receiving member(s) provided with said bearing means for supporting the outer peripheral portion of said bearing plate.

2. An improved windshield wiper assembly as in claim 1, wherein said wiper arm comprises:
a main arm and a sub-arm freely rotatable about a hinge point thereof,
said sub-arm being formed with a slot at its hinged portion through which said pivot shaft of said main arm passes, and
said slot having its size and configuration determined according to the diameter of said pivot shaft as well as the rotational angle of said wiper arm.

3. An improved windshield wiper assembly as in claim 1, wherein:
an extension formed in said arm joint constitutes a driving lever for driving said wiper arm, and
said driving lever is operatively connectable to a wiper driving motor through connecting means.

4. An improvement for use in a windshield wiper assembly comprising a wiper arm with wiping blade means at the end thereof, a pivot shaft for supporting said wiper arm, an arm joint for connecting said wiper arm to said pivot shaft and bearing means for supporting said pivot shaft, said improvement comprising:
a disc-like bearing plate integrally formed with said pivot shaft and extending radially therefrom, and
at least one pressure receiving member provided with said bearing means for supporting the outer peripheral portion of said bearing plate.

5. An improvement as in claim 4 wherein said pressure receiving member comprises pressure receiving means fixed with respect to said bearing means and slotted for receiving an edge portion of said bearing plate.

6. An improvement as in claim 4 wherein:
said bearing plate includes a plurality of recesses disposed around its outer periphery, and
said at least one pressure receiving member comprises a plurality of roller bearing means, each with at least a portion thereof being rotatably journaled within one of said recessed and disposed between said periphery and said bearing means.

7. An improvement as in claim 4 wherein said at least one pressure receiving member comprises:
a plurality of axles fixed with respect to said bearing means and disposed outside the periphery of said bearing plate, and
roller bearing means rotatably disposed on said axles for rotatably engaging said periphery.

8. An improvement as in claim 7 wherein said roller bearing means are generally cylindrical in shape with a recessed section disposed around the circumference of said cylindrical shape.

* * * * *